Sept. 9, 1947.  F. W. KOEHLER ET AL  2,427,145
APPARATUS FOR MEASURING PULMONARY CAPACITY OF HUMAN BEINGS
Filed March 6, 1947
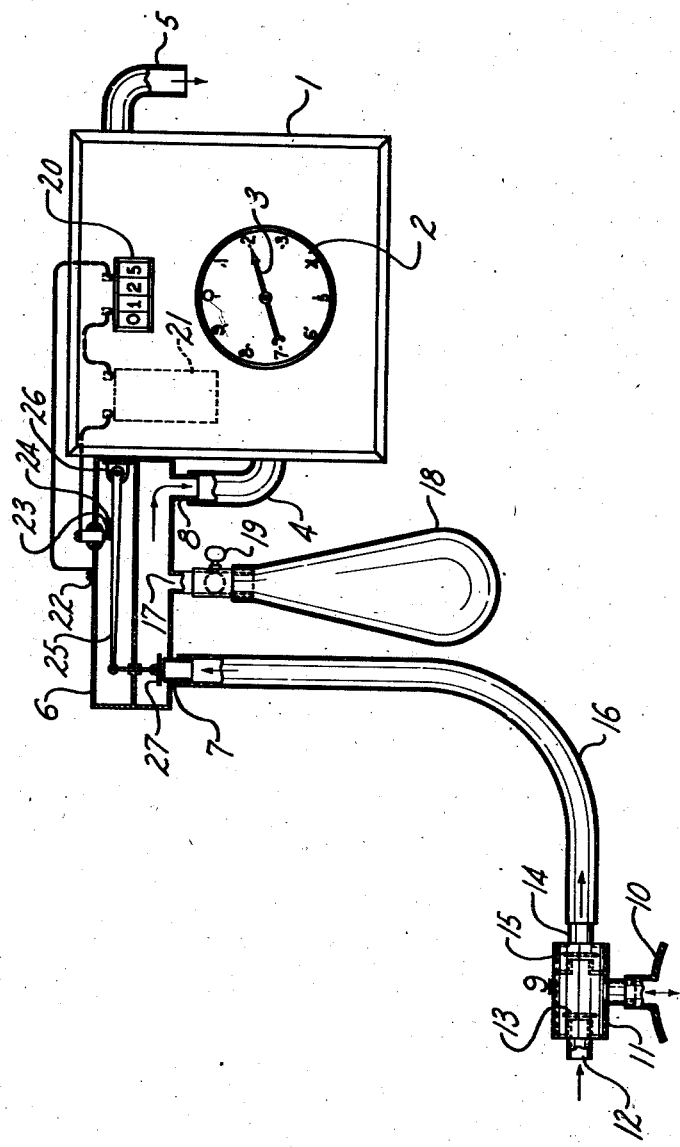
INVENTOR
Frederick W. Koehler
and John W. D. Harmon
BY
William B. Jaspert
ATTORNEY Patented Sept. 9, 1947

2,427,145

UNITED STATES PATENT OFFICE 2,427,145

APPARATUS FOR MEASURING PULMONARY CAPACITY OF HUMAN BEINGS

Frederick W. Koehler, Pittsburgh, and John W. G. Hannon, Washington, Pa.

Application March 6, 1947, Serial No. 732,810

4 Claims. (Cl. 128—2.08)

This invention relates to apparatus for respiratory function tests for measuring the components of pulmonary capacity.

It is among the objects of the invention to provide simple, accurate and portable means for measuring pulmonary capacity for use in industry to determine disability in silicosis and to otherwise ascertain the respiratory functions of prospective employees or such as are exposed to industrial conditions which tend to the impairment of the lungs.

One of the important components of pulmonary capacity is the vital capacity of the individual, this being the amount of air expired in the fullest possible expiration and the normal and maximum minute ventilation.

Tests of the above character have previously been conducted by the use of spirometers or vitalometers, which is expensive equipment and not portable. In accordance with the present invention it is proposed to provide improved portable apparatus that furnishes accurate recordings of the volume of air that can be forced from the lungs during a normal expiration and the total volume of air that can be forced from the lungs per minute or other unit of time, the apparatus also recording the number of exhalations within the test period.

In accordance with the present invention a volume per exhalation or per unit of time is registered by passing through a gas meter in a steady continuous flow and the number of exhalations are recorded by a counter mechanism that is actuated by the pulsations of the inhalation or exhalation function.

The invention will become more apparent from a consideration of the accompanying drawing, constituting a part hereof, in which like reference characters designate like parts, and in which the single figure is a front elevational view, partially in section, of a device for measuring the pulmonary capacity of the lungs embodying the principles of this invention.

In the drawing, numeral 1 designates a gas meter having a dial 2 calibrated in liters and having an indicator 3 for registering the liter volume of air passing through the meter, the meter having an inlet passage 4 and an outlet 5. Passage 4 is connected to a manifold 6 having an inlet 7 and an outlet 8, the latters being connected to the passage 4, and the inlet 7 being connected to a breathing apparatus generally designated by the numeral 9. The breathing device has a mask 10, which may be placed over the face, leading to a valve chamber 11 having an inlet 12 divided by a valve 13 that opens when the user draws a breath and closes upon exhalation. Chamber 11 has an outlet 14 provided with a valve 15 that opens upon exhalation and closes upon inhalation, the chamber 11 being connected by a flexible conduit 16 to the inlet 7 of the manifold 6.

Manifold 6 is provided with a passage 17 to which is connected a collapsible bag 18. A valve 19 is provided to shut off access to the bag 18, which functions as an expansion chamber for leveling off the impulses of the exhalated air entering the manifold at 7 and leaving at 8 so that there are no surges of air flowing into the meter which would impair the accuracy of the reading of the indicator 3 on dial 2.

The number of exhalations are registered by a counter mechanism, generally designated at 20, which is an electrical device connected to a battery 21 and which, in the circuit shown in the drawing, is mounted on the manifold frame 6 at 22. The circuit to the counter 20 is completed by contacts 23 and 24, the latter being mounted on a lever 25 fulcrumed at 26 and actuated by a breather valve 27 that controls the passage of the manifold inlet 7. Upon each exhalation of the breather through the mask 10 and conduit 16, valve 27 is displaced upwardly, moving lever 25 which closes contacts 23 and 24 to complete the circuit of the counter to register the impulse.

In the use of the above-described apparatus in determining the vital capacity which is the total volume per complete exhalation, the counter mechanism, of course, is unimportant as there is but a single exhalation involved. The gas meter 1 is adjusted to a dial setting of zero. Valve 19 is closed as for this test the expansible bag 18 is not needed. The breathing valve 10 is placed in the mouth of the user who takes a deep breath, drawing air into chamber 11 through passage 12, and then exhalates or exhausts the lungs through chamber 11, outlet 14, into the manifold 6 from which it passes through exit 8 to the intake side 4 of the gas meter, registering the total volume of the exhalation on the dial 2.

For the maximum minute ventilation test, valve 19 is opened to establish communication of the inflatable bag 18 with the manifold 6, and the subject being tested continues to inhale and exhale through the breathing valve 10 for a given period of time, such as a minute or multiple thereof, and upon each exhalation valve 27 raises to effect contact of the electrical circuit that energizes the counter 20, thereby registering the total number of exhalations during the test period. The total volume of the exhaled air passes through the gas meter and registers the liters of air exhalated during the test period. The inflatable bag 18 gradually fills and functions as an expansion chamber which deadens the surges of the air passing into the gas meter so as to provide a steady flow of air therethrough, which results in a steady movement of the dial indicator 3, resulting in extreme accuracy of the reading which is otherwise impaired by the pulsations or surges which in each instance must overcome the static friction of the indicating mechanism.

It is evident from the foregoing description of the invention that the apparatus is a simple and relatively inexpensive one with no delicate parts that might be injured or displaced in the handling of the device. Also it is evident that the equipment accurately records the number and volume of exhalations for which the test is made and is of such a compact nature that it can be readily strapped to a worker's shoulders to conduct tests when the victim is subjected to physical exertion, to thereby determine the varying rates of pulmonary activity under regular working conditions.

Although one embodiment of the invention has been herein illustrated and described, it will be evident to those skilled in the art that various modifications may be made in the details of construction without departing from the principles herein set forth.

We claim:

1. Apparatus for measuring pulmonary capacity comprising a manifold having an inlet and outlet connection, said inlet connection having a valve, a counter mechanism for registering the exhalation passing through the manifold, means for energizing said counter mechanism including control means actuated by said manifold valve to energize the counter in response to the exhalator impulses.

2. Apparatus for measuring pulmonary capacity comprising a manifold having an inlet for receiving the exhalations of the user and an outlet for connection to a meter, a counter having a valve connection responsive to the exahalations passing into the monifold to register the number of exhalations per unit of time, and said meter being calibrated in liters to indicate the volume per exhalation or per unit of time.

3. Apparatus for measuring pulmonary capacity comprising a manifold having an inlet for receiving the exhalations of the user and an outlet for connection to a meter, a counter having a valve connection responsive to the exhalations passing into the manifold to register the number of exhalations per unit of time, and said meter being calibrated in liters to indicate the volume per exhalation or per unit of time, said manifold having an expansion chamber interposed between the manifold inlet and outlet passages to eliminate the impulses of the exhalated air passing to the meter.

4. Apparatus for measuring pulmonary capacity comprising a manifold having an inlet and outlet passage, the inlet passage being connected to a breathing mask and the outlet passage being connected to a gas meter, a counter for registering the number of exhalations into said manifold, and electrical control means for operating said counter comprising a power circuit having a movable contact mounted on a lever fulcrumed in the manifold, said lever having a valve in the path of the inlet passage to be actuated thereby in response to exhalations from the breathing mask.

FREDERICK W. KOEHLER.
JOHN W. G. HANNON.

REFERENCES CITED

The following references are of record in the file of this patent:

UNITED STATES PATENTS

| Number | Name | Date |
|---|---|---|
| 631,334 | Sanders | Aug. 22, 1899 |